United States Patent
Altherr et al.

(10) Patent No.: US 8,003,580 B2
(45) Date of Patent: Aug. 23, 2011

(54) CONSOLIDATED PROPPANTS HAVING HIGH MECHANICAL STRENGTH AND PROCESS FOR THE PREPARATION THEREOF

(75) Inventors: Andreas Altherr, Spiesen-Elversberg (DE); Klaus Endres, Homburg (DE); Bernd Reinhard, Merzig-Brotdorf (DE); Helmut Schmidt, Saarbruecken-Guedingen (DE)

(73) Assignee: Kraiburg Geotech GmbH, Saarbruecken (DE)

( * ) Notice: Subject to any disclaimer, the term of this patent is extended or adjusted under 35 U.S.C. 154(b) by 364 days.

(21) Appl. No.: 12/294,327

(22) PCT Filed: Apr. 23, 2007

(86) PCT No.: PCT/EP2007/003553
§ 371 (c)(1),
(2), (4) Date: Dec. 16, 2008

(87) PCT Pub. No.: WO2007/121975
PCT Pub. Date: Nov. 1, 2007

(65) Prior Publication Data
US 2009/0264323 A1    Oct. 22, 2009

(30) Foreign Application Priority Data
Apr. 24, 2006  (DE) .................. 10 2006 018 939

(51) Int. Cl.
*C09K 8/56*  (2006.01)
*E21B 33/13*  (2006.01)
*C08G 77/00*  (2006.01)

(52) U.S. Cl. ..... 507/233; 166/286; 166/295; 166/305.1; 507/221; 507/219; 507/234; 528/10

(58) Field of Classification Search ........... 507/233, 507/221, 219, 234; 166/285, 295, 305.1; 528/10
See application file for complete search history.

(56) References Cited

U.S. PATENT DOCUMENTS
2002/0016380 A1   2/2002   Hayashi et al.
2007/0158070 A1   7/2007   Endres et al.
2008/0103067 A1   5/2008   Schmidt et al.

FOREIGN PATENT DOCUMENTS
| DE | 196 20 818 | 11/1997 |
| DE | 10 2005 002 806 | 8/2006 |
| EP | 1 167 406 | 1/2002 |
| WO | 2005/073278 | 8/2005 |
| WO | 2006/077123 | 7/2006 |

OTHER PUBLICATIONS

English Language Abstract of DE 196 20 818.
Brinker C. J. et al., Sol Gel Science—The Physics and Chemistry of Sol-Gel-Processing, (Academic Press, Boston San Diego, New York, Sydney 1990); pp. 108-115.

*Primary Examiner* — Timothy J. Kugel
(74) *Attorney, Agent, or Firm* — Greenblum & Bernstein, P.L.C.

(57) ABSTRACT

A process for the preparation of hydrolytically and hydrothermally stable consolidated proppants is described, in which (A) a consolidating agent comprising (A1) a hydrolysate or precondensate of at least one functionalized organosilane, a further hydrolyzable silane and at least one metal compound, the molar ratio of silicon compounds used to metal compounds used being in the range of 10 000:1 to 10:1, and (A2) an organic crosslinking agent are mixed with a proppant and (B) the consolidating agent is cured at elevated pressure and elevated temperature.
The consolidated proppants obtained have high mechanical strength.

21 Claims, No Drawings

CONSOLIDATED PROPPANTS HAVING HIGH MECHANICAL STRENGTH AND PROCESS FOR THE PREPARATION THEREOF

BACKGROUND OF THE INVENTION

1. Field of the Invention

The invention relates to a process for the preparation of hydrothermally consolidated and hydrolytically stable, consolidated proppants having improved mechanical strength.

2. Discussion of Background Information

Binders are very important in particular for binding compact or granular products. In the mineral oil industry, the process of fracturing has proved particularly useful for increasing and stabilizing oil production in oil-containing deposits. For this purpose, an artificial fissure is first produced in the oil-carrying formation around the borehole by means of a highly viscous fluid (fracture fluid). To ensure that this fissure remains open, the highly viscous fluid is provided with so-called proppants, which maintain the fissure as a region of increased porosity and permeability after removal of the pressure which is necessary for producing and maintaining the formation fissure. Proppants are in particular sands and ceramic particles which have diameters of several 100 μm to a few millimeters and are positioned in the rock fissure. As a rule, these proppants have to be consolidated in order to prevent flowback with the oil produced. Binders which initially cure under the conditions of the reservoir developed (high pressure in combination with high temperature, ground water of the reservoir itself and aggressive components in the crude oils and gasses) and are stable in the long term during oil production are required for this purpose.

For efficient use of binders, it is important that the stability under the abovementioned aggressive conditions is maintained for as long as possible, and the binding strength and the porosity must not be significantly reduced. The systems which are mentioned in the prior art and which are virtually all based on organic polymers have a very limited life in this respect.

The consolidation of proppants with suitable binders is difficult particularly when it is intended that the consolidated proppants do not significantly lose porosity in comparison with the proppants without binder. Thus, porous composites can be prepared, for example, using organic polymer binders, but it is found that it is scarcely possible to maintain the original porosity. With reduced use of binder, it is possible to prepare porous systems but, owing to the properties of the organic polymers whereby they swell or go into solution in the presence of organic solvents, such composites are not suitable for many applications, in particular at relatively high temperatures and in an environment of organic liquids.

The use of purely inorganic binders which are obtainable, for example, via the sol-gel process leads to binding where an appropriate porosity is maintained in the proppant, but the bound system is very brittle, friable and insufficiently resistant to mechanical loads, such as shear loads or strong pressure loads.

Furthermore, it is frequently expedient to prepare proppants under the conditions under which they will also subsequently be used. It is therefore frequently necessary to cure the proppants on site after introduction into the fracture under the geological pressure and temperature conditions. In the case of many consolidating agents, this is not possible or is possible with loss of the necessary stabilities to hydrolysis.

The patent application DE 102005002806.3 of the applicant describes a process for the preparation of consolidated proppants in which a hydrolysate or condensate of an organosilane, a hydrolyzable silane and a metal compound is used as the consolidating agent. The use of this organically modified inorganic consolidating agent affords consolidated proppants which exhibit substantially improved stability to hydrolysis and to corrosion under hydrothermal conditions in comparison with the prior art. Since high resistance to the formation of fragmentary structures is required with the use of the proppants, there is still a need for an additional improvement in the mechanical strength of the proppants obtained.

It was therefore an object of the invention to provide a process for the preparation of consolidated proppants which, under the pressure and temperature conditions of the area of use, are stable to hydrolysis and to corrosion and have a relatively high porosity and moreover possess a further improved mechanical strength.

SUMMARY OF THE INVENTION

The present invention provides a process for the preparation of a consolidated proppant, which process comprises mixing a consolidating agent with a proppant and curing the resultant mixture at elevated pressure and elevated temperature. The consolidating agent comprises
(A1) a hydrolysate or condensate of
  (i) at least one functionalized organosilane of formula (I)

$$(Rx)_b R_c SiX_{4-b-c} \qquad (I)$$

in which the radicals Rx are identical or different and represent groups which cannot be eliminated hydrolytically and comprise at least one crosslinkable functional group, the radicals R are identical or different and represent groups which cannot be eliminated hydrolytically, the radicals X are identical or different and represent group which can be eliminated hydrolytically or hydroxyl groups, b is 1,2 or 3, c is 0,1 or 2, (b+c) being 1,2 or 3;
  (ii) optionally, at least one hydrolysable silane of formula (II)

$$SiX_4 \qquad (II)$$

in which X is as defined in formula (I); and
    at least one metal compound of formula (III)

$$MX_a \qquad (III)$$

in which M is a metal of main groups I to VIII or of subgroups II to VIII of the Periodic Table of Elements, including boron, X is as defined in formula (I), it being possible for two groups X to be replaced by an oxo group, and a corresponds to the valency of M; the molar ratio of silicon compounds used to metal compounds used being from 10,000:1 to 10:1, and
(A2) an organic crosslinking agent having at least two functional groups.

In one aspect of the process of the present invention, (A1) may be formed by hydrolysis or condensation of (i) at least one functionalized organosilane of formula (I) as defined above, (ii) at least one hydrolysable silane of formula (II) as defined above, (iii) at least one metal compound of formula (III) as defined above, and (iv) at least one organosilane of formula (Ia)

$$R_n SiX_{4-n} \qquad (Ia)$$

in which the radicals R are identical or different and represent groups which cannot be eliminated hydrolytically, the radicals X are identical or different and represent groups which can be eliminated hydrolytically or hydroxyl groups and is 1,2 or 3, the molar ratio of silicon compounds used to metal compounds used being from 10,000:1 to 10:1.

In another aspect of the process, the weight ratio of the sum of silicon compounds and metal compounds us for making (A1) to (A2) may be from 1:5 to 1:0.3 and/or the molar ratio of the functional groups of the functionalized organolilane to the functional groups of (A2) may be from 10:1 to 1:2.

In yet another aspect of the process, the functional groups of the functionalized organosilane and of (A2) may comprise one or more of vinyl, acryloyl and methacryloyl groups.

In a still further aspect, (A2) may comprise one or more of a di-or polyfunctional acrylate or methacrylate, an unsaturated polyester and an epoxy resin.

In another aspect, the consolidating agent may comprise a thermal catalyst.

In another aspect of the process, the consolidating agent may be cured at a temperature of at least 40°C. and a pressure of at least 8 bar.

In yet another aspect, M in formula (III) may be selected from B, Al, Zr, and Ti, and may in particular, comprise Ti.

In a still further aspect of the process, before and/or during curing a liquid or gaseous medium may be passed through and mixed with the proppant to be consolidated to adjust the porosity. For example, the liquid or gaseous medium may comprise air and/or may be loaded with volatile, gaseous or vaporizable acids, bases or other catalysts.

In another aspect of the present process, the proppant may be consolidated after it has been placed in a fracture by subsequent injection of the consolidating agent and subsequent curing.

In yet another aspect, the consolidating agent may comprise a hydrolysate or precondensate of (i) a vinyl-, acryloyl- or methacryloylsilane, (ii) an orthosilicic acid ester, (iii) a metal alkoxylate, and (iv) an alkylsilane and/or the consolidating agent may be prepared by a sol-gel process using a substoichiometric amount of water, based on the hydrolysable groups present.

In another aspect of the process, prior to mixing with the proppant the consolidating agent may be present in particle-free form.

In a still further aspect, the proppant may comprise pellets and/or particles of one or more of sand, ceramic, walnut shell, aluminum, and nylon.

The present invention also provides a consolidated proppant. The proppant has hydrolytic stability under hydrothermal conditions and is obtainable by the process of the present invention (including the various aspects thereof) as set forth above.

In one aspect, the proppant may be porous. For example, the proppant may have a degree of porosity of from 5% to 50%.

DETAILED DESCRIPTION OF THE INVENTION

By means of the process according to the invention, it was surprisingly possible to achieve a further increase in the mechanical consolidation of the proppant samples in comparison with organically modified inorganic binders, in particular under hydrothermal conditions. The increase in the mechanical consolidation is important in particular for achieving higher resistances to the formation of fragmentary structures (e.g. fines formation). It was possible to show that, by means of the consolidating agent used according to the invention, interpenetrating inorganic and organic networks are formed on curing, with the result that a substantial improvement in the mechanical strength can be achieved.

It was found in particular that the network strength could be substantially improved by using an organic crosslinking agent having at least two functional groups, preferably crosslinking dimethacrylates or higher-functional methacrylates which, together with the functionalized organosilanes, preferably acryloyl and/or vinyl-functionalized silanes, form an organic network which is covalently linked to the inorganic network via the silanes, and the mechanical solidification could be substantially improved. At the same time, flexibilization of the consolidating agent was achieved.

The proppants bound according to the invention are not degraded even in an autoclave at high pressure and high temperature, even over a relatively long period, and a stable bond is maintained. The use of hydrolyzable metal compounds of the formula (III) has two advantages: particularly good stability of the cured consolidating agents to hydrolysis under hydrothermal conditions and the possibility of curing the consolidating agent also under elevated pressure. Surprisingly, this strength was also retained when the organic crosslinking agent was used.

Proppants have already been generally explained above and are generally known to the person skilled in the art in the area. Proppants are pellets or particles which are frequently substantially spherical. They generally have an approximate average diameter of several hundred microns, e.g. in the range of between 1000 and 1 μm. The proppants may be, for example, coarse-grain sand, ceramic particles, e.g. comprising $Al_2O_3$, $ZrO_2$ or mullite, natural products, such as walnut shells, or metal or plastic particles, such as aluminium or nylon pellets. The proppants are preferably sand or ceramic particles.

The consolidating agent comprises a hydrolysate or condensate of (a) at least one functionalized organosilane of the general formula (I)

$$(Rx)_b R_c SiX_{4-b-c} \quad (I)$$

in which the radicals Rx are identical or different and represent groups which cannot be eliminated hydrolytically and comprise at least one crosslinkable functional group, the radicals R are identical or different and represent groups which cannot be eliminated hydrolytically, the radicals X are identical or different and represent groups which can be eliminated hydrolytically or hydroxyl groups, b has the value 1, 2 or 3 and c has the value 0, 1 or 2, the sum (b+c) being 1, 2 or 3;

(b) optionally at least one hydrolyzable silane of the general formula (II)

$$SiX_4 \quad (II)$$

in which X is as defined in formula (I); and (c) at least one metal compound of the general formula (III)

$$MX_a \quad (III)$$

in which M is a metal of main groups I to VIII or of subgroups II to VIII of the Periodic Table of the Elements, including boron, X is as defined in formula (I), it being possible for two groups X to be replaced by an oxo group, and a corresponds to the valency of the element;

the molar ratio of silicon compounds used to metal compounds used being in the range of 10 000:1 to 10:1.

It is preferable if a silane of the general formula (II) is used.

In a preferred embodiment, an organosilane of the formula (Ia)

$$R_n SiX_{4-n} \quad (Ia)$$

in which the radicals R are identical or different and represent groups which cannot be eliminated hydrolytically, the radicals X are identical or different and represent groups which can be eliminated hydrolytically or hydroxyl groups and n has the value 1, 2 or 3, is furthermore additionally used for the preparation of the hydrolysate or condensate.

In the formula (I), b is preferably 1 and c is preferably 0 so that the functionalized organosilane of the formula (I) is preferably $(Rx)SiX_3$ or $(Rx)R_cSiX_{3-c}$, in which c is 1 or 2. In the formula (Ia), n is preferably 1 or 2 and particularly preferably 1. Below, the substituents X, R and Rx in the formulae (I), (Ia), (II) and (III) are explained in more detail.

Suitable examples of groups X of the above formulae which can be eliminated hydrolytically are hydrogen, halogen (F, Cl, Br or I, in particular Cl or Br), sulphate, alkoxy (e.g. $C_{1-6}$-alkoxy, such as, for example, methoxy, ethoxy, n-propoxy, isopropoxy, n-butoxy, isobutoxy, sec-butoxy or tert-butoxy), aryloxy (preferably $C_{6-10}$-aryloxy, such as, for example, phenoxy), alkaryloxy, e.g. benzoyloxy, acyloxy (e.g. $C_{1-6}$-acyloxy, preferably $C_{1-4}$-acyloxy, such as, for example, acetoxy or propionyloxy) and alkylcarbonyl (e.g. $C_{2-7}$-alkylcarbonyl, such as acetyl). $NH_2$, amino mono- or disubstituted by alkyl, aryl and/or aralkyl, examples of the alkyl, aryl and/or aralkyl radicals being those stated below for R, amido, such as benzamido, or aldoxime or ketoxime groups are also suitable. Two or three groups X may also be linked to one another, for example in Si-polyol complexes with glycol, glycerol or pyrocatechol. X may also be a hydroxyl group. Said group may optionally contain substituents, such as halogen, hydroxyl or alkoxy.

Preferred radicals X which can be eliminated hydrolytically are halogen, alkoxy groups and acyloxy groups. Particularly preferred radicals which can be eliminated hydrolytically are $C_{2-4}$-alkoxy groups, in particular methoxy and ethoxy.

The radicals R and Rx of the formulae (I) and (Ia) which cannot be eliminated hydrolytically are in particular organic radicals which are bonded to the Si atom via a carbon atom. This Si—C bond is not hydrolyzable. Apart from the bond to the Si, this C atom preferably has only bonds to C and/or H atoms. In particular, the radical R has no crosslinkable functional groups.

The radicals R of the formula (Ia) and optionally (I) which cannot be eliminated hydrolytically are, for example, alkyl (e.g. $C_{1-20}$-alkyl, in particular $C_{1-4}$-alkyl, such as methyl, ethyl, n-propyl, isopropyl, n-butyl, isobutyl, sec-butyl and tert-butyl), aryl (in particular $C_{6-10}$-aryl, such as phenyl and naphthyl) and corresponding aralkyl and alkaryl groups, such as tolyl and benzyl, and cyclic $C_3$-$C_{12}$-alkyl and $C_3$-$C_{12}$-alkenyl groups, such as cyclopropyl, cyclopentyl and cyclohexyl. Preferred radicals R which are used in particular for silanes of the formula (Ia) are radicals without substituents or functional groups, in particular alkyl groups, preferably having 1 to 4 carbon atoms, in particular methyl and ethyl, and aryl radicals, such as phenyl, alkyl groups being particularly preferred.

The radicals Rx comprise at least one functional group via which crosslinking of the condensate by the organic crosslinking agent is possible, with the result that an interpenetrating organic and inorganic network can be formed on curing. Examples of the functional group via which crosslinking is possible are epoxide (e.g. glycidyl or glycidyloxy), hydroxyl, amino, carboxyl, vinyl, alkynyl, acryloyl or acryloyloxy, methacryloyl or methacryloyloxy and isocyanato. These functional groups are linked to the silicon atom via divalent bridge groups, in particular alkylene, alkenylene or arylene bridge groups, which may be interrupted by oxygen or —NH— groups. Bridge groups contain, for example, 1 to 18, preferably 1 to 8 and in particular 1 to 6 carbon atoms. Said divalent bridge groups are derived, for example, from the above-mentioned monovalent alkyl or aryl radicals. The bridge group is preferably an alkylene group, in particular a propylene group. The radical Rx preferably has a functional group but may also have more than one functional group. Preferred functional groups via which crosslinking is possible are vinyl, acryloyl, acryloyloxy, methacryloyl or methacryloyloxy.

Examples of radicals Rx which cannot be eliminated hydrolytically and via which crosslinking is possible are alkenyl, e.g. $C_{2-20}$-alkenyl, in particular $C_{2-4}$-alkenyl, such as vinyl, 1-propenyl, 2-propenyl and butenyl, glycidyl- or glycidyloxy-$(C_{1-20})$-alkylene, such as β-glycidyloxyethyl, γ-glycidyloxypropyl, δ-glycidyloxybutyl, ε-glycidyl-oxypentyl, ω-glycidyloxyhexyl and 2-(3,4-epoxycyclohexyl)ethyl, (meth)acryloyloxy-$(C_{1-6})$-alkylene, e.g. (meth)acryloyloxymethyl, (meth)acryloyloxyethyl, (meth)acryloyloxypropyl or (meth)acryloyloxybutyl, and 3-isocyanatopropyl. (Meth)acryloyloxypropyl is particularly preferred. In this description, (meth)acryloyl represents acryloyl or methacryloyl. These functionalized organosilanes are also referred to, for example, as (meth)acryloylsilanes, vinylsilanes, epoxysilanes, etc., according to their functionalized group.

Examples of functionalized organosilanes of the general formula (I) are:

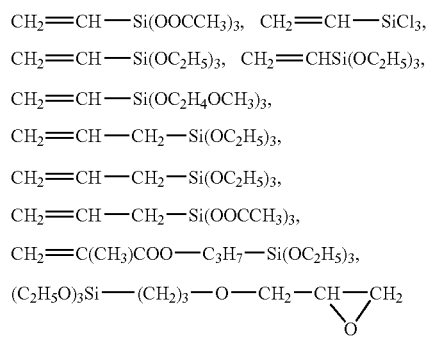

Preferred examples are acryloylsilanes and methacryloylsilanes, such as (meth)acryloyloxyalkyltrimethoxysilane and (meth)acryloyloxyalkyltriethoxysilane, in particular, (meth)acryloyloxypropyltrimethoxysilane and (meth)acryloyloxypropyl-triethoxysilane, (meth)acryloyloxypropylmethyldimethoxysilane, (meth)-acryloyloxyethyltrimethoxysilane and (meth)acryloyloxyethylmethyldimethoxysilane, methacryloyloxypropyltrimethoxysilane being particularly preferred.

Examples of organosilanes of the general formula (Ia) are compounds of the following formulae, the alkylsilanes and in particular methyltriethoxysilane being particularly preferred: $CH_3SiCl_3$, $CH_3Si(OC_2H_5)_3$, $C_2H_5SiCl_3$, $C_2H_5Si(OC_2H_5)_3$, $C_3H_7Si(OC_2H_5)_3$, $C_6H_5Si(OC_2H_5)_3$, $(C_2H_5O)_3Si-C_3H_6-Cl$, $(CH_3)_2SiCl_2$, $(CH_3)_2Si(OC_2H_5)_2$, $(CH_3)_2Si(OH)_2$, $(C_6H_5)_2SiCl_2$, $(C_6H_5)_2Si(OC_2H_5)_2$, $(i-C_3H_7)_3SiOH$, $n-C_6H_{13}CH_2CH_2Si(OC_2H_5)_3$, $n-C_8H_{17}CH_2CH_2Si(OC_2H_5)_3$.

Examples of the hydrolyzable silanes of the general formula (II) are $Si(OCH_3)_4$, $Si(OC_2H_5)_4$, $Si(O-n-$ or $i-C_3H_7)_4$, $Si(OC_4H_9)_4$, $SiCl_4$, $HSiCl_3$, $Si(OOCCH_3)_4$. Among these hydrolyzable silanes, tetraethoxysilane is particularly preferred.

The silanes can be prepared by known methods; cf. W. Noll, "Chemie und Technologie der Silicone" [Chemistry and Technology of the Silicones], Verlag Chemie GmbH, Weinheim/Bergstrβe (1968).

In the metal compound of the general formula (III)

$$MX_a \qquad (III)$$

M is a metal of main groups I to VII or of subgroups II to VIII of the Periodic Table of the Elements including boron, X is as defined above, it being possible for two groups X to be replaced by an oxo group, and a corresponds to the valency of the element.

M is not Si. Here, boron is also counted among the metals. Examples of such metal compounds are compounds of glass- or ceramic-forming elements, in particular compounds of at least one element M from main groups III to V and/or subgroups II to IV of the Periodic Table of the Elements. They are preferably hydrolyzable compounds of Al, B, Sn, Ti, Zr, V or Zn, in particular those of Al, Ti or Zr, or mixtures of two or more of these elements. It is also possible to use, for example, hydrolyzable compounds of elements of main groups I and II of the Periodic Table (e.g. Na, K, Ca and Mg) and of subgroups V to VIII of the Periodic Table (e.g. Mn, Cr, Fe and Ni). Hydrolyzable compounds of the lanthanoids, such as Ce, can also be used. Metal compounds of the elements B, Ti, Zr and Al are preferred, Ti being particularly preferred.

Preferred metal compounds are, for example, the alkoxides of B, Al, Zr and in particular Ti. Suitable hydrolyzable metal compounds are, for example, $Al(OCH_3)_3$, $Al(OC_2H_5)_3$, $Al(O\text{-}n\text{-}C_3H_7)_3$, $Al(O\text{-}n\text{-}C_3H_7)_3$, $Al(O\text{-}n\text{-}C_4H_9)_3$, $Al(O\text{-sec-}C_4H_9)_3$, $AlCl_3$, $AlCl(OH)_2$, $Al(OC_2H_4OC_4H_9)_3$, $TiCl_4$, $TiOSO_4$, $Ti(OC_2H_5)_4$, $Ti(O\text{-}n\text{-}C_3H_7)_4$, $Ti(O\text{-}i\text{-}C_3H_7)_4$, $Ti(OC_4H_9)_4$, $Ti(2\text{-ethylhexyloxy})_4$, $ZrCl_4$, $Zr(OC_2H_5)_4$, $Zr(O\text{-}n\text{-}C_3H_7)_4$, $Zr(O\text{-}i\text{-}C_3H_7)_4$, $Zr(OC_4H_9)_4$, $ZrOCl_2$, $Zr(2\text{-ethylhexyloxy})_4$, and Zr compounds which have complex-forming radicals, such as, for example, β-diketone and (meth)acryloyl radicals, sodium ethanolate, potassium acetate, boric acid, $BCl_3$, $B(OCH_3)_3$, $B(OC_2H_5)_3$, $SnCl_4$, $Sn(OCH_3)_4$, $Sn(OC_2H_5)_4$, $VOCl_3$ and $VO(OCH_3)_3$.

In a particularly preferred embodiment, the consolidating agent is prepared using a methacryloylsilane, such as methacryloyloxypropyltrimethoxysilane, an alkylsilane, such as methyltriethoxysilane (MTEOS), an orthosilicic acid ester, such as tetraethoxysilane (TEOS), and a metal compound of the formula (III), the use of a metal compound B, Al, Zr and in particular Ti being particularly preferred. In an embodiment, it is also possible to add an arylsilane, such as phenyltriethoxysilane, optionally in combination with an organosilane of the formula (Ia).

For the preparation of the consolidating agent, preferably at least 50 mol %, more preferably at least 70 mol % and in particular at least 80 mol % of organosilanes of the formulae (I) and, if used, (Ia) having at least one group which cannot be eliminated by hydrolysis, based on all compounds used for the hydrolysate or condensate, are used. The remainder comprises hydrolyzable compounds, namely the metal compounds of the formula (III) and optionally the hydrolyzable silanes of the formula (II) which have no groups which cannot be hydrolyzed.

The molar ratio of the silicon compounds of the formulae (I), (Ia) and (II) which are used to metal compounds of the formula (III) which are used is in the range of 10 000:1 to 10:1, particularly good stability to hydrolysis being achieved in the range of 2000:1 to 20:1 and particularly preferably of 2000:1 to 200:1.

For calculating the molar proportions or ratios which are stated above, in each case the monomeric compounds are used as a starting point in the case of the compounds. If, as explained below, already precondensed compounds (dimers, etc.) are used as starting materials, it is necessary to convert to the corresponding monomers.

The hydrolysates or condensates of the consolidating agent were obtained from hydrolyzable silanes and the hydrolyzable metal compounds by hydrolysis and optionally condensation. Hydrolysates or condensates are understood as meaning in particular hydrolyzed or at least partly condensed compounds of the hydrolyzable starting compounds. Instead of the hydrolyzable monomeric compounds, it is also possible to use already precondensed compounds as starting materials in the synthesis of the consolidating agent. Such oligomers which are preferably soluble in the reaction medium may be, for example, straight-chain or cyclic low molecular weight partial condensates (e.g. polyorganosiloxanes) having a degree of condensation of, for example, about 2 to 100, in particular about 2 to 6.

The hydrolysates or condensates are preferably obtained by hydrolysis and condensation of the hydrolyzable starting compounds by the sol-gel process. In the sol-gel process, the hydrolyzable compounds are hydrolyzed with water, optionally in the presence of acid or basic catalysts, and at least partly condensed. The hydrolysis and condensation are preferably effected in the presence of acidic condensation catalysts (e.g. hydrochloric acid, phosphoric acid or formic acid) at a pH of, preferably, 1 to 3. The resulting sol can be adjusted to the viscosity desired for the consolidating agent by suitable parameters, e.g. degree of condensation, solvent or pH.

Further details of the sol-gel process are described, for example, in C. J. Brinker, G. W. Scherer: "Sol-Gel Science— The Physics and Chemistry of Sol-Gel-Pro-cessing", Academic Press, Boston, San Diego, New York, Sydney (1990).

Stoichiometric amounts of water, but also smaller or larger amounts, may be used for the hydrolysis and condensation. A substoichiometric amount of water, based on the hydrolyzable groups present, is preferably used. The amount of water used for the hydrolysis and condensation of the hydrolyzable compounds is preferably 0.1 to 0.9 and particularly preferably 0.25 to 0.75 mol of water per mole of the hydrolyzable groups present. Often, particularly good results are obtained with less than 0.7 mol of water, in particular 0.55 to 0.65 mol of water, per mole of the hydrolyzable groups present. The hydrolysate or condensate used according to the invention is present in particular in particle-free form as a solution or emulsion.

The consolidating agent furthermore comprises an organic crosslinking agent having at least two functional groups. The functional groups serve for crosslinking of the hydrolysis product or condensate. They are chosen so that they are reactive with the functional group of the functionalized organosilane. During curing, the functional groups of the crosslinking agent then react with the functional groups of the functionalized organosilane with formation of covalent bonds so that crosslinking takes place.

It is possible to use customary organic crosslinking agents known to the person skilled in the art. Suitable crosslinking agents are, for example, organic monomers, oligomers and polymers or prepolymers. The organic crosslinking agents are network-forming polymerization precursors.

The organic crosslinking agents may contain two or more functional groups. They are chain-forming organic compounds which are suitable for polymerization, polycondensation or polyaddition. These organic crosslinking agents are very familiar to the person skilled in the art and he can readily choose them for the respective case. The functional groups are the customary groups which are capable of undergoing polymerization, polycondensation or polyaddition and are used in polymer chemistry. Examples of the functional groups are epoxy, hydroxyl, amino, carboxyl, isocyanate, mercapto, vinyl, acryloyl or methacryloyl groups, vinyl, acryloyl and methacryloyl groups being preferred. Corresponding groups of derivatives of the carboxylic acid, such as carboxylic anhydride and acyl halide groups, in particular acyl chloride groups, are also suitable.

The functional groups of the crosslinking agent are matched with the crosslinkable functional group of the functionalized organosilane by choosing corresponding pairs of functional groups which are suitable for a polymerization, polycondensation or polyaddition reaction. The person skilled in the art is familiar with these corresponding pairs. The corresponding functional groups of the organosilanes and of the crosslinking agent may be, for example, in each case identical or different C—C double bonds, such as vinyl, acryloyl or methacryloyl. Further examples of corresponding pairs are amino/carboxyl, epoxy/amino, epoxy/carboxylic anhydride and isocyanate/hydroxyl.

Examples of the crosslinking agents are di- to polyfunctional acrylates and methacrylates, including unsaturated polyesters and epoxy resins. The crosslinking agents may be defined individual compounds or mixtures of compounds having different degrees of polymerization. Examples are diethylene glycol dimethacrylate (DEGMA), triethylene glycol dimethacrylate (TEGDMA), bisphenol A glycidylmethacrylate (BisGMA), urethane dimethacrylate (UDMA), Laromer® acrylate from BASF, Ebecryl®, pentaerythrityl triacrylate (PETIA), hexanediol diacrylate, trimethylolpropane triacrylate, trimethylolpropane trimethacrylate, neopentylglycol dimethacrylate, neopentylglycol diacrylate, epoxyacrylate resin, oligomeric methacrylates, such as LR 8862, LR 8907 from BASF, or oligomeric urethane acrylates, such as UA 19T from BASF.

The abovementioned crosslinking agents having acryloyl or methacryloyl groups are preferably used if functionalized organosilanes having (meth)acryloyl, (meth)acryloyloxy or vinyl groups are present in the hydrolysate.

The weight ratio of silicon compounds and metal compounds together, which are used for the hydrolysate or condensate, to the organic crosslinking agent can be chosen by the person skilled in the art in a suitable manner from a broad range, a weight ratio in the range of 1:5 to 1:0.3 being preferred. The molar ratio of functional groups of the functionalized organosilane to the functional groups of the crosslinking agent may vary within broad ranges, a preferred molar ratio being in the range of 10:1 to 1:2.

The crosslinking agent can be added to the starting compounds of the hydrolysis product or condensate before the hydrolysis or condensation or preferably after the formation of the hydrolysate or condensate. The consolidating agent used according to the invention is present in particular in particle-free form as a solution or emulsion. Before use, consolidating agent can be activated by adding a further amount of water.

The consolidating agent may contain conventional additives and solvents, such as water, alcohols, preferably lower aliphatic alcohols ($C_1$-$C_8$-alcohols), such as methanol, ethanol, 1-propanol, isopropanol and 1-butanol, ketones, preferably lower dialkyl ketones, such as acetone and methyl isobutyl ketone, ethers, preferably lower dialkyl ethers, such as diethyl ether, or monoethers of diols, such as ethylene glycol or propylene glycol, with $C_1$-$C_8$-alcohols, amides, such as dimethylformamide, tetrahydrofuran, dioxane, sulphoxides, sulphones or butylglycol and mixtures thereof. Water and alcohols are preferably used. It is also possible to use high-boiling solvents, e.g. polyethers, such as triethylene glycol, diethylene glycol diethyl ether and tetraethylene glycol dimethyl ether. In some cases, other solvents are also used, e.g. light paraffins (petroleum ether, alkanes and cycloalkanes), aromatics, heteroaromatics and halogenated hydrocarbons. Dicarboxylic esters, such as dimethyl succinate, dimethyl adipate, dimethyl glutarate and mixtures thereof, and the cyclic carboxylic esters, such as, for example, propylene carbonate and glyceryl carbonate, may also be used.

Other conventional additives are, for example, dyes, pigments, viscosity regulators and surfactants. For the preparation of emulsions of the consolidating agent, the stabilizing emulsifiers customary in the case of silicone emulsions, such as, for example, Tween® 80 and Brij® 30, may be used.

The consolidating agent preferably also contains a thermal catalyst, which is also referred to as the initiator, in order to initiate the thermal curing or crosslinking. These thermal catalysts are known to the person skilled in the art and he can readily choose the suitable ones taking into account the components used. Examples of free radical thermal initiators are organic peroxides, e.g. diacyl peroxides, peroxydicarbonates, alkyl peresters, alkyl peroxides, perketals, ketone peroxides and alkyl hydroperoxides, and azo compounds. Specific examples are dibenzoyl peroxide, tert-butyl perbenzoate, amyl peroxy-2-ethylhexanoate and azobisisobutyronitrile. These initiators are used in the customary amounts known to the person skilled in the art, e.g. 0.01 to 5% by weight, based on the total solids content of the consolidating agent.

For the preparation of consolidated proppants, the consolidating agent is mixed with the proppants to be consolidated, for example by mixing, pumping in or injection, and then cured. It can, for example, be injected subsequently after positioning of the proppants in the fracture in the proppant-carrying formation fissure and then cured.

The consolidation or curing is effected at elevated temperature and elevated pressure, based on the normal conditions, i.e. the pressure is greater than 1 bar and the temperature is higher than 20° C. Preferably, the consolidating agent is cured at a temperature and a pressure which correspond approximately to the general geological conditions of the reservoir in which the proppants are used, as a rule at temperatures above 40° C. and at least 8 bar. Depending on the formation depth, temperatures up to 160° C. and pressures up to 500 bar may be necessary for the curing. The curing is preferably effected under hydrothermal conditions of the reservoir in which use is intended.

It is known that thermal curing of consolidating agents at ambient pressure is rather unproblematic. A progressive condensation reaction occurs as a result of continuously removing the solvent and the reaction product water from the mixture of binder sol and material to be consolidated. In the further thermal curing process, the consolidating agent is compacted on the material to be consolidated.

The properties of consolidated materials depend, however, on the conditions under which they are prepared. As a rule, improved behavior of the consolidated materials is obtained if they are prepared approximately under the same conditions under which they are to be used. For applications of consolidated materials at elevated pressures and temperatures, it is therefore desirable also to carry out the preparation under approximately the same conditions. However, this is problematic for the consolidating agents according to the prior art since, on curing consolidating agents according to the prior art at elevated pressure and elevated temperature, i.e. under hydrothermal conditions, solvent and reaction products remain in the system and it is possible only to establish an equilibrium. However, the equilibrium position under these conditions does not give solidified or consolidated materials, respectively.

It was found that the equilibrium position is changed by the use of the metal compounds of the formula (III) so that setting of the consolidating agent used was possible under hydrothermal conditions (elevated pressure and elevated temperature). In this way, consolidated proppants can be obtained under hydrothermal conditions. By using the organic crosslinking agents, improved mechanical strength and good flexibility are additionally achieved.

The curing of the consolidating agent under hydrothermal conditions can also be supported by addition of anhydrides to the consolidating agent. With the aid of the anhydrides, condensation products, such as water and ethanol, can be scavenged. The anhydrides are preferably anhydrides of organic acids or mixtures of these anhydrides. Examples are acetic anhydride, methylnadic anhydride, phthalic anhydride, succinic anhydride and mixtures thereof.

When anhydrides are added, it is preferably to use, for example, cyclic carbonic esters, such as propylene carbonate, or carboxylic esters, such as dimethyl glutarate, dimethyl adipate and dimethyl succinate, or mixtures of dimethyl dicarboxylates comprising said esters, as solvents. For this purpose, the suitable solvent can as a rule be completely or partly exchanged for the solvent used or formed in the preparation of the consolidating agent. In addition to the solvent exchange, it is also possible to use a preferred solvent even in the preparation of the consolidating agent.

The curing of proppants to be consolidated is therefore possible under hydrothermal conditions. The functional groups of the functionalized organosilane are reactive with the functional groups of the crosslinking agent, so that covalent bonds are formed between them under the curing conditions. In this way, an organic network which is covalently linked to the resulting inorganic network or via the functional groups is formed. Interpenetrating inorganic and organic networks which consolidate the proppant are thus formed by the process according to the invention.

Since, under hydrothermal conditions, a compaction process of the gelled consolidating agent is partly or completely prevented, the consolidating agent gel can close the pores in large volumes. This can preferably be prevented or eliminated by passing a solid or liquid medium into the proppant which is to be consolidated and is mixed with the consolidating agent, with the result that the porosity can be adjusted in the desired manner. The introduction is effected in particular before or during the curing process over a certain period.

Parameters for the through-pumping, such as duration, time, amount or flow rate of the liquid or gaseous phase, can be readily chosen by the person skilled in the art in a suitable manner in order to establish the desired porosity. The introduction can be effected, for example, before or after partial curing, complete curing taking place after and/or during the introduction. For introduction of a liquid or gaseous medium, for example, an inert solvent or gas, e.g. $N_2$, $CO_2$ or air, can be pumped in, with the result that the pore volumes are flushed clear and reaction products are removed. Reference may be made to the above-mentioned as examples of solvents for the liquid medium. The liquid or gaseous medium can optionally contain catalysts and/or gas-liberating components or dissolved substances.

The curing of the consolidating agent can optionally be supported by supplying condensation catalysts which produce crosslinking of the inorganically crosslinkable SiOH groups or metal-OH groups with formation of an inorganic network. Condensation catalysts suitable for this purpose are, for example, bases or acids, but also fluoride ions or alkoxides. These can be added, for example to the consolidating agent, shortly before the mixing with the proppant. In a preferred embodiment, the gaseous or liquid media which are described above and are passed through the proppant or the geological formation are loaded with the catalyst. The catalyst is preferably volatile, gaseous or vaporizable. The catalyst may contain dissolved substances, such as, for example, zirconium oxychloride, and may be metered into the binder in the form of a gradient.

The consolidated proppants are preferably porous, the degree of porosity of the consolidated proppants (ratio of volume of pores to the total volume of the proppant) preferably being 5 to 50% and particularly preferably 20 to 40%.

For the experimental simulation of the geological conditions, a so-called "displacement cell" customary in the oil industry is preferably used for characterizing the properties of consolidating agent and consolidated proppants. In this cell, a cylindrical test specimen which contains the proppant to be consolidated is subjected, via the lateral surface made of lead, to a confinement pressure which simulates the geological formation pressure (e.g. 70 bar) and is compacted. Via the end faces of the sample cylinder, the media are introduced and discharged against an opposing pressure of, for example, 50 bar. For thermal curing, the cell is thermostafted. Strengths up to 5.9 MPa are achieved. The strength is retained even after storage of the moldings under hydrothermal conditions in corrosive media.

The proppants according to the invention can advantageously be used in gas, mineral oil or water recovery, in particular in offshore production. Owing to its chemical constitution, the consolidating agent according to the invention permits rapid and effective consolidation. By using the organic crosslinking agent, the strength of the consolidated proppants can be increased several times over.

In this context, the additional use of phenylsilane alkoxide has also proved useful. This is presumably based on the fact that these compounds, owing to the steric hindrance of the phenyl group and the electronic effects, do not have rapidly reacting OH groups which bind particularly well to the surface of inorganic materials.

The following examples and comparative examples serve to illustrate the invention.

EXAMPLES

Comparative Example Consolidating Agent without Organic Crosslinking Agent $MTTi_{0.1}P_3$ 06

26.2 g of MTEOS, 7.64 g of TEOS and 0.087 g of titanium tetraisopropoxide were mixed and were reacted with 12.63 g of demineralised water and 0.088 ml of concentrated hydrochloric acid (37%) with vigorous stirring. After the transition point, the reaction mixture exceeded a temperature maximum of 62° C. After the reaction mixture had cooled to 47° C., a further silane mixture which consists of 26.45 g of phenyltriethoxysilane, 6.54 g of MTEOS and 7.64 g of TEOS was added to the batch and stirring was continued for a further 5 minutes. After standing overnight, the binder is suitable for consolidating proppants under hydrothermal conditions. The pH can be adjusted in the range between pH 0 and 7 depending on requirements.

For this purpose, for example 100 g of proppants were mixed with 10 g of toluene and packed into a cylindrical lead sleeve. The planar ends of the cylinder were covered with a wire screen. In a displacement cell, the test specimen was compacted for 1 h with the aid of a pressure of 250 bar (confinement pressure) applied to the lead casing. Thereafter, the binder was injected into the proppant body at 120° C. at a flow rate of 0.5 ml at a confinement pressure of 70 bar and against an opposing pressure of 20 bar applied using an $N_2$ gas cylinder. After injection of two pore volumes of binder, the porosity was established by blowing in $N_2$ for 30 minutes and subsequent curing was effected for 14 h. The moldings obtained exhibit compressive strength in the range of 0.3 to 0.5 MPa and a porosity between 36 and 40%.

Example 1

Consolidating Agent with Organic Crosslinking Agent MPMTTi$_{0.1}$-DEGDMA/AIBN 8.92 g of MTEOS, 39.05 g of TEOS, 156.51 g of methacryloyloxypropyltrimethoxysilane and 0.246 g of titanium tetraisopropoxide were mixed and were reacted with 48.07 g of demineralised water and 1.25 ml of concentrated hydrochloric acid (37%) with vigorous stirring. After the transition point, the reaction mixture exceeded a temperature maximum of 57° C. After the reaction mixture had cooled to 25° C., a mixture which consists of 96.1 g of diethylene glycol dimethacrylate and 0.235 g of 2,2'-azobisisobutyronitrile (AIBN) was added to the reaction mixture and stirring was continued for a further 5 minutes. The binder was then used for consolidating proppants under hydrothermal conditions at 70° C. and 70 bar. After injection in the displacement experiment, strengths up to 5.9 MPa result.

Example 2

Consolidating Agent with Organic Crosslinking Agent MTMPTi$_{0.1}$-DEGDMA/AIBN 63.85 g of MTEOS, 30.83 g of TEOS, 31.29 g of methacryloyloxypropyltrimethoxysilane and 0.179 g of titanium tetraisopropoxide were mixed and were reacted with 19.39 g of demineralised water and 3.19 g of TiOSO$_4$/H$_2$SO$_4$ with vigorous stirring. After the transition point, the reaction mixture exceeded a temperature maximum of 68° C. After the reaction mixture had cooled to 25° C., a mixture which consists of 50.45 g of diethylene glycol dimethacrylate and 0.823 of 2,2'-azobisisobutyronitrile (AIBN) was added to the reaction mixture and stirring was continued for a further 5 minutes. The binder was then used for consolidating proppants under hydrothermal conditions at 70° C. and 70 bar. After injection in the displacement experiment, strengths up to 2.0 MPa result.

Example 3

Consolidating Agent with Organic Crosslinking Agent MTMP-VTi$_{0.1}$-TEGDMA-BisGMA/Trigonox 121

63.85 g of MTEOS, 30.83 g of TEOS, 28.16 g of methacryloyloxypropyltrimethoxysilane, 2.40 g of vinyltriethoxysilane and 0.18 g of titanium tetraisopropoxide were mixed and were reacted with 19.39 g of demineralised water and 3.19 g of TiOSO$_4$/H$_2$SO$_4$ with vigorous stirring. After the transition point the reaction mixture exceeded a temperature maximum of 68° C. After the reaction mixture had cooled to 25° C., a mixture which consists of 47.7 g of triethylene glycol dimethacrylate, 21.35 g of ethoxylated bisphenol A glycidyl dimethacrylate (Ebecryl® 150) and 1.154 g of tert-amylperoxy-2-ethylhexanoate (Trigonox 121) was added to the reaction mixture and stirring was continued for a further 5 minutes. The binder is then used for consolidating proppants under hydrothermal conditions at 70° C. and 70 bar. After injection in the dispersant experiment, strengths up to 2.1 MPa result.

What is claimed is:

1. A process for the preparation of a consolidated proppant, which process comprises
   (a) mixing a consolidating agent with a proppant; and
   (b) curing the consolidating agent mixed with the proppant at elevated pressure and elevated temperature;
   the consolidating agent comprising
   (A1) a hydrolysate or condensate of
      (i) at least one functionalized organosilane of formula (I)

$$(Rx)_b R_c SiX_{4-b-c} \quad (I)$$

in which the radicals Rx are identical or different and represent groups which cannot be eliminated hydrolytically and comprise at least one crosslinkable functional group, the radicals R are identical or different and represent groups which cannot be eliminated hydrolytically, the radicals X are identical or different and represent groups which can be eliminated hydrolytically or hydroxyl groups, b is 1, 2 or 3, c is 0, 1 or 2, (b+c) being 1, 2 or 3;
      (ii) optionally, at least one hydrolyzable silane of formula (II)

$$SiX_4 \quad (II)$$

in which X is as defined in formula (I); and
      (iii) at least one metal compound of formula (III)

$$MX_a \quad (III)$$

in which M is a metal of main groups I to VIII or of subgroups II to VIII of the Periodic Table of Elements, including boron, X is as defined in formula (I), it being possible for two groups X to be replaced by an oxo group, and a corresponds to the valency of M;
      a molar ratio of silicon compounds used to metal compounds used being from 10,000:1 to 10:1, and
   (A2) an organic crosslinking agent having at least two functional groups.

2. The process of claim 1, wherein M in formula (III) is selected from B, Al, Zr, or Ti.

3. The process of claim 2, wherein M in formula (III) comprises Ti.

4. The process of claim 1, wherein before and/or during curing a liquid or gaseous medium is passed through and mixed with the proppant to be consolidated to adjust a porosity.

5. The process of claim 4, wherein the liquid or gaseous medium comprises air.

6. The process of claim 4, wherein the liquid or gaseous medium is loaded with volatile, gaseous or vaporizable acids, bases or other catalysts.

7. A consolidated proppant, wherein the proppant has hydrolytic stability under hydrothermal conditions and is obtainable by the process of claim 1.

8. The consolidated proppant of claim 7, wherein the proppant is porous.

9. The consolidated proppant of claim 7, wherein the proppant has a degree of porosity of from 5% to 50%.

10. The process of claim 1, wherein (A1) is formed by hydrolysis or condensation of
    (i) at least one functionalized organosilane of formula (I)
    (iv) at least one organosilane of formula (Ia)

$$R_n SiX_{4-n} \quad (Ia)$$

in which the radicals R are identical or different and represent groups which cannot be eliminated hydrolytically, the radicals X are identical or different and represent groups which can be eliminated hydrolytically or hydroxyl groups and n is 1, 2 or 3, (ii) at least one hydrolyzable silane of formula (II), and (iii) at least one metal compound of formula (III);

a molar ratio of silicon compounds used to metal compounds used being from 10,000:1 to 10:1.

11. The process of claim 1, wherein a weight ratio of a sum of silicon compounds and metal compounds used for making (A1) to (A2) is from 1:5 to 1:0.3.

12. The process of claim 1, wherein a molar ratio of functional groups of the functionalized organosilane to functional groups of (A2) is from 10:1 to 1:2.

13. The process of claim 1, wherein functional groups of the functionalized organosilane and of (A2) comprise one or more groups selected from vinyl, acryloyl or methacryloyl groups.

14. The process of claim 1, wherein (A2) comprises one or more of a di-or polyfunctional acrylate or methacrylate, an unsaturated polyester or an epoxy resin.

15. The process of claim 1, wherein the consolidating agent comprises a thermal catalyst.

16. The process of claim 1, wherein the consolidating agent is cured at a temperature of at least 40° C. and a pressure of at least 8 bar.

17. The process of claim 1, wherein the proppant is consolidated after it has been placed in a fracture by subsequent injection of the consolidating agent and subsequent curing.

18. The process of claim 1, wherein the consolidating agent comprises a hydrolysate or precondensate of (i) a vinyl-, acryloyl- or methacryloylsilane, (iv) an alkylsilane, (ii) an orthosilicic acid ester and (iii) a metal alkoxylate.

19. The process of claim 1, wherein the consolidating agent is prepared by a sol-gel process using a substoichiometric amount of water, based on the hydrolyzable groups present.

20. The process of claim 1, wherein prior to mixing with the proppant the consolidating agent is present in particle-free form.

21. The process of claim 1, wherein the proppant comprises pellets and/or particles of one or more of sand, ceramic, walnut shell, aluminum, or nylon.

* * * * *